(12) United States Patent
Teramachi et al.

(10) Patent No.: US 8,272,289 B2
(45) Date of Patent: Sep. 25, 2012

(54) ROLLER SCREW

(75) Inventors: Akihiro Teramachi, Tokyo (JP); Hidekazu Michioka, Tokyo (JP); Hiroshi Niwa, Tokyo (JP); Akimasa Yoshida, Tokyo (JP)

(73) Assignee: THK Co., Ltd., Tokyo (JP)

( * ) Notice: Subject to any disclaimer, the term of this patent is extended or adjusted under 35 U.S.C. 154(b) by 830 days.

(21) Appl. No.: 11/662,095

(22) PCT Filed: Sep. 7, 2005

(86) PCT No.: PCT/JP2005/016406
§ 371 (c)(1),
(2), (4) Date: Jan. 17, 2008

(87) PCT Pub. No.: WO2006/028124
PCT Pub. Date: Mar. 16, 2006

(65) Prior Publication Data
US 2008/0245170 A1    Oct. 9, 2008

(30) Foreign Application Priority Data

Sep. 8, 2004 (JP) .................................. 2004-260502

(51) Int. Cl.
*F16H 1/24* (2006.01)
*F16H 55/02* (2006.01)
(52) U.S. Cl. ................ 74/424.86; 74/424.81; 74/424.82; 74/424.87
(58) Field of Classification Search ............... 74/424.81, 74/424.82, 424.83, 424.84, 424.86, 424.87
See application file for complete search history.

(56) References Cited

U.S. PATENT DOCUMENTS
2,844,044 A * 7/1958 Cole .......................... 74/424.82
(Continued)

FOREIGN PATENT DOCUMENTS
JP    63-154854 U    10/1988
(Continued)

OTHER PUBLICATIONS

International Preliminary Report on Patentability (Forms PCT/IPEA/409) of International Application No. PCT/JP2005/016406 International filing date Sep. 7, 2005 with English translation.

(Continued)

*Primary Examiner* — Justin Krause
*Assistant Examiner* — Adam D Rogers
(74) *Attorney, Agent, or Firm* — Westerman, Hattori, Daniels & Adrian, LLP

(57) ABSTRACT

A roller screw is provided having a structure suitable for circulating rollers. The roller screw has a screw shaft 5 with a spiral roller rolling groove 5a formed on an outer peripheral surface thereof; a nut 6 with a spiral roller rolling groove 6a opposed to the roller rolling groove of the screw shaft and formed on an inner peripheral surface thereof; and a plurality of rollers 7 arranged in a load roller rolling path 9 between the roller rolling groove 5a of the screw shaft 5 and the roller rolling groove 6a of the nut 6. Inside the nut 6 is provided a roller return path 11 extending linearly in parallel with an axis line of the nut 6. To opposite end faces in an axis line direction of the nut 6 are attached direction change path forming members 13 in which direction change paths 10 to connect the load roller rolling path 9 and the roller return path 11 are formed. The roller return path 11 is twisted to rotate an attitude of each of the rollers 7 while the rollers 7 move in the roller return path 11.

4 Claims, 14 Drawing Sheets

U.S. PATENT DOCUMENTS

| | | | | |
|---|---|---|---|---|
| 3,053,105 A * | 9/1962 | Cole | | 74/424.86 |
| 3,055,230 A * | 9/1962 | Strassberg | | 74/424.82 |
| 3,192,791 A * | 7/1965 | Greby | | 74/424.82 |
| 3,971,264 A * | 7/1976 | Detraz et al. | | 74/424.87 |
| 4,439,011 A * | 3/1984 | Machmerth | | 359/825 |
| 4,953,419 A * | 9/1990 | Schlenker | | 74/424.86 |
| 5,193,409 A * | 3/1993 | Babinski | | 74/424.83 |
| 5,791,192 A * | 8/1998 | Lee | | 74/424.87 |
| 5,988,007 A * | 11/1999 | Nishimura | | 74/424.87 |
| 6,176,149 B1 * | 1/2001 | Misu | | 74/424.82 |
| 6,425,302 B2 * | 7/2002 | Greubel | | 74/424.87 |
| 6,446,520 B1 * | 9/2002 | Nagai et al. | | 74/89.33 |
| 6,481,305 B2 * | 11/2002 | Nishimura et al. | | 74/424.83 |
| 6,561,053 B2 * | 5/2003 | Greubel | | 74/424.87 |
| 6,575,632 B2 * | 6/2003 | Kawaguchi et al. | | 384/51 |
| 7,523,681 B2 * | 4/2009 | Pan et al. | | 74/424.82 |
| 7,591,205 B2 * | 9/2009 | Kato | | 74/424.87 |
| 7,845,251 B2 * | 12/2010 | Wu | | 74/424.86 |
| 8,146,453 B2 * | 4/2012 | Uesugi et al. | | 74/424.82 |
| 2001/0017062 A1 * | 8/2001 | Nishimura et al. | | 74/424.81 |
| 2001/0022110 A1 * | 9/2001 | Roland | | 74/424.87 |
| 2001/0025540 A1 * | 10/2001 | Greubel | | 74/424.87 |
| 2002/0026844 A1 * | 3/2002 | Fujita | | 74/424.86 |
| 2003/0024336 A1 * | 2/2003 | Ohkubo | | 74/424.82 |
| 2003/0138172 A1 * | 7/2003 | Yabe et al. | | 384/45 |
| 2004/0182190 A1 * | 9/2004 | Murakami et al. | | 74/424.82 |
| 2004/0211280 A1 * | 10/2004 | Nishimura et al. | | 74/424.82 |
| 2006/0016284 A1 * | 1/2006 | Kato | | 74/424.88 |
| 2006/0156843 A1 * | 7/2006 | Becker et al. | | 74/424.82 |
| 2007/0137345 A1 * | 6/2007 | Hayashi et al. | | 74/424.81 |
| 2007/0137347 A1 * | 6/2007 | Teramachi et al. | | 74/424.86 |
| 2007/0137349 A1 * | 6/2007 | Tokura et al. | | 74/424.86 |
| 2007/0204711 A1 * | 9/2007 | Budaker et al. | | 74/388 PS |
| 2007/0221002 A1 * | 9/2007 | Pan | | 74/424.82 |
| 2008/0110285 A1 * | 5/2008 | Pan et al. | | 74/424.86 |
| 2008/0110286 A1 * | 5/2008 | Nishimura et al. | | 74/424.87 |
| 2008/0134822 A1 * | 6/2008 | Pan et al. | | 74/424.87 |
| 2008/0302197 A1 * | 12/2008 | Liu et al. | | 74/424.82 |
| 2009/0070078 A1 * | 3/2009 | Miyahara et al. | | 703/1 |
| 2009/0158873 A1 * | 6/2009 | Wu et al. | | 74/424.86 |
| 2009/0158874 A1 * | 6/2009 | Shige et al. | | 74/424.87 |
| 2009/0249912 A1 * | 10/2009 | Michioka et al. | | 74/424.91 |
| 2010/0058885 A1 * | 3/2010 | Uesugi et al. | | 74/424.89 |
| 2010/0064836 A1 * | 3/2010 | Wu | | 74/424.86 |
| 2010/0101347 A1 * | 4/2010 | Uesugi et al. | | 74/424.75 |
| 2010/0180707 A1 * | 7/2010 | Wu | | 74/424.87 |
| 2010/0263467 A1 * | 10/2010 | Miyahara et al. | | 74/424.87 |

FOREIGN PATENT DOCUMENTS

| | | | |
|---|---|---|---|
| JP | 154854 U | 10/1988 | |
| JP | 3-121341 A | 5/1991 | |
| JP | 11210858 A | 8/1999 | |
| JP | 11-210858 A | 9/1999 | |
| JP | 2000-161459 A | 6/2000 | |
| JP | 2000161459 A | 6/2000 | |
| JP | 2001-241527 A | 9/2001 | |
| JP | 2006118649 A * | 5/2006 | |
| JP | 2006189134 A * | 7/2006 | |
| JP | 2008039050 A * | 2/2008 | |
| WO | WO 0192762 A1 * | 12/2001 | |
| WO | WO 2006100997 A1 * | 9/2006 | |

OTHER PUBLICATIONS

International Search Report of PCT/JP2005/016406, date of mailing Dec. 13, 2005.

* cited by examiner

VIEW TAKEN ALONG LINE IV-IV
AND VIEWED IN THE DIRECTION
OF THE ARROWS (A)  (B) B-B CROSS SECTION

DETAIL VIEW
OF VIII PORTION (A)  (B)

(A)  (B)

(A)          (B)

(A)          (B)

(A)　　　　　(B)

(A)　　　　　　　　　　　(B)

Y-Y CROSS SECTION

X-X CROSS SECTION

ROLLER SCREW

TECHNICAL FIELD

The present invention relates to a roller screw with rollers capable of rolling between a screw shaft and a nut.

BACKGROUND ART

A ball screw with balls capable of rolling between a screw shaft and a nut enables a reduction in coefficient of friction in rotating the screw shaft with respect to the nut as compared with a screw coming into sliding contact, and therefore, is in practical use in a positioning mechanism of a machine tool, feeding mechanism, steering gear of an automobile and the like.

In recent years, to increase an allowable load, a roller screw has been devised which uses rollers as rolling members, instead of balls, as in Patent Document 1. The roller screw uses a return pipe to circulate the rollers. Each of the rollers rolling in a roller rolling groove of the screw shaft is scooped by the return pipe, passed through the return pipe, returns to an original position, and circulates infinitely. The return pipe is formed in the shape of a substantially gate in the entire shape, and formed of a center portion and the opposite end portions bent toward the center portion. Bonding portions between the center portion and opposite end portions are formed in the shape of an arc to circulate the rollers smoothly.
Patent Document 1: Japanese Laid-Open Paten Publication No. 2001-241527

DISCLOSURE OF INVENTION

Problems to be Solved by the Invention

As shown in FIG. 19, each of rollers 1a, 1b is held between a roller rolling groove 2a of a screw shaft 2 and a roller rolling groove 3a of a nut 3. The roller 1a on the roller rolling groove 2a and the roller 1b on the adjacent roller rolling groove 2a should be spaced a distance more than or equal to a length of a diagonal line of the rollers 1a, 1b, and a lead L of the roller rolling grooves 2a, 3a tends to increase, as compared with the ball screw. When the diameter of the roller is increased and/or the number of threads is increased to increase the allowable load, the lead L is further increased.

For the shape of the return pipe, to circulate the rollers smoothly, it is necessary to increase a radius of curvature of the arc of the bonding portion between the center portion and each of the opposite end portions of the return pipe, as compared with the case of a ball screw, not to clog the arc portion with the rollers.

In attaching the return pipe to a nut, a groove is processed on the side face of the nut, and the return pipe is set in the groove. However, when the lead is increased and/or the radius of curvature of the arc portion of the return pipe is increased, it is difficult to design the groove to which the return pipe is attached in the nut while avoiding the roller rolling groove of the nut (without the return pipe attaching groove interfering with the roller rolling groove).

Further, as distinct from the ball, the shape of the side face of the roller is rectangular, and the cross-sectional shape of the load roller rolling path between the screw shaft and nut is also rectangular. In order for the roller to circulate smoothly, it is required to match the attitude of the roller with the shape of the load roller rolling path when the roller is scooped from the load roller rolling path and returned to the load roller rolling path again.

Therefore, it is an object of the invention to solve the problems and provide a roller screw with a structure suitable for circulating rollers.

Means for Solving the Problem

The invention will be described below. In addition, reference numerals in accompanying drawings are added in brackets for ease in understanding the invention, but the invention is not thereby limited to embodiments as shown in the drawings.

To solve the above-mentioned problems, the invention of claim 1 provides a roller screw having a screw shaft (5) with a spiral roller rolling groove (5a) formed on the outer peripheral surface thereof, a nut (6) with a spiral roller rolling groove (6a) formed on the inner peripheral surface thereof to be opposed to the roller rolling groove (5a) of the screw shaft (5), and a plurality of rollers (7) arranged in a load roller rolling path (9) between the roller rolling groove (5a) of the screw shaft (5) and the roller rolling groove (6a) of the nut (6), where inside the nut (6) is provided a roller return path (11) extending linearly in parallel with an axis line of the nut (6), and to opposite end faces in the axis line direction of the nut (6) are attached direction change path forming members (13) in which direction change paths (10) to connect the load roller rolling path (9) and the roller return path (11) are formed are formed, and the roller return path (11) is twisted rotate the attitude of each of the rollers (7) for a period during which each of the rollers (7) moves in the roller return path (11).

The invention of claim 2 is characterized by the roller screw as described in claim 1 where the roller return path (11) is twisted to rotate the attitude of each of the rollers (7) for a period during which each of the rollers (7) moves in the roller return path (11).

The invention of claim 3 is characterized by the roller screw as described in claim 1 where center lines of a pair of the direction change paths (10) provided at opposite end faces of the nut (6) cross each other at a predetermined open angle (α) as viewed from the axis line direction of the screw shaft (5), and the roller return path (11) rotates the attitude of each of the rollers (7) the predetermined open angle (α).

The invention of claim 4 is characterized by the roller screw as described in claim 1 or 3 where in the nut (6) is formed a through hole (17) extending in the axis line direction of the nut (6), and in the through hole (17) is inserted a roller return path forming member (12) in which the roller return path (11) is formed.

The invention of claim 5 is characterized by the screw roller as described in any one of claims 1, 3 and 4 where the roller rolling groove (5a) of the screw shaft (5) is formed to have a V-shaped cross section, the roller rolling groove (6a) of the nut (6) is formed also to have a V-shaped cross section, and the plurality of rollers is cross-arranged in the load roller rolling path (9) so that axis lines of adjacent rollers (7) are perpendicular to each other as viewed from the direction in which the rollers (7) proceed.

The invention of claim 6 is characterized by the roller screw as described in any one of claims 1 to 5 where in each of the direction change path forming members (13) is formed a portion (23) bent in the shape of a curve conforming to the shape of an inner periphery of each of the direction change paths (10) while protruding to the inside of the nut from respective opposite end faces of the nut to which the direction change path forming members (13) are attached, and escape grooves (19) conforming in shape to the portion (23) bent in the shape of a curve of each of the direction change path forming members (13) are respectively formed in the opposite end faces of the nut (6) to which the direction change path forming members (13) are attached.

Advantageous Effect of the Invention

According to the invention of claim 1, even when the lead is increased, it is possible to design the roller return path and the direction change path without interfering with the roller rolling groove of the nut. When the roller is scooped from the load roller rolling path and returned to the load roller rolling path again, it is possible to conform the attitude of the roller with the rectangular side face to the shape of the load roller rolling path of rectangular cross section. Further, there is the fear of clogging with the roller when the attitude of the roller is rotated in the direction change path, but the roller is rotated in the linear roller return path, and therefore, the fear of clogging with the roller is eliminated.

According to the invention of claim 2, when the roller is scooped from the load roller rolling path and returned to the load roller rolling path again, it is possible to conform the attitude of the roller with the rectangular side face to the shape of the load roller rolling path of rectangular cross section. Further, there is the fear of clogging with the roller when the attitude of the roller is rotated in the direction change path, but the roller is rotated in the linear roller return path, and therefore, the fear of clogging with the roller is eliminated.

When the attitude of the roller is rotated as in claim 3, the roller on which the load is imposed from one direction of the axis line of the screw shaft returns to the load roller rolling path without being inverted (while allowing the load to be imposed on the roller again from the one direction).

According to the invention of claim 4, the roller return path forming member linearly extending is a different member from the nut, and it is made ease to manufacture the twisted roller return path.

The invention is suitable for use in the roller screw in a cross arrangement as described in claim 5.

According to the invention of claim 6, it is possible to prevent the direction change path forming member from interfering with the roller rolling groove of the nut.

DESCRIPTION OF SYMBOLS

Figure 1:
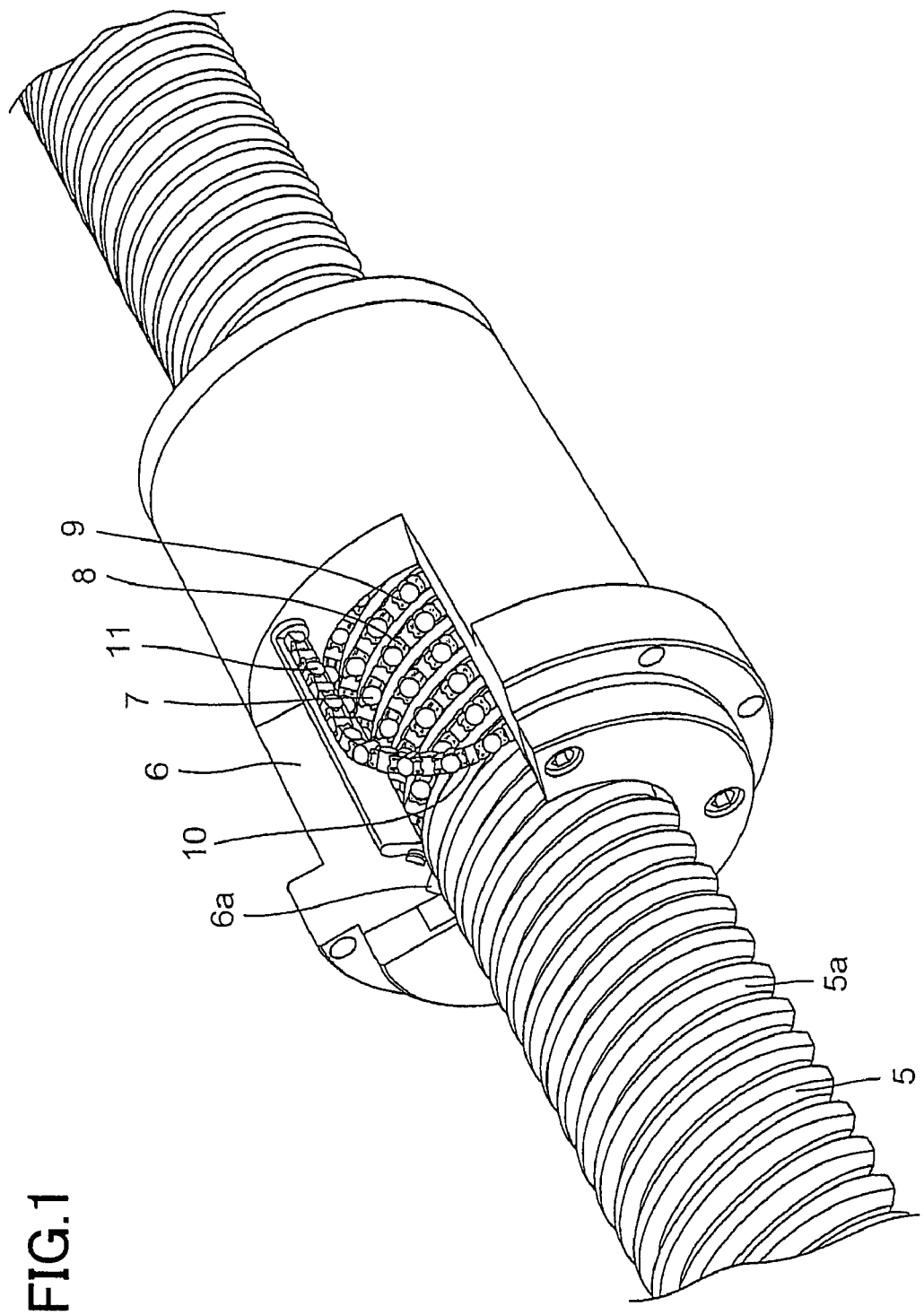
FIG. 1 is a perspective view of a roller screw in one embodiment of the invention.

5 . . . Screw shaft
5a . . . Roller rolling groove
6 . . . Nut
6a . . . Nut rolling groove
7 . . . Roller
9 . . . Load roller rolling path
10 . . . Direction change path
11 . . . Roller return path
12 . . . Roller return path forming member
13 . . . Direction change path forming member
13a . . . Inner peripheral side of the direction change path forming member
13b . . . Outer peripheral side of the direction change path forming member
17 . . . Through hole
19 . . . Escape groove
23 . . . Thin portion
α . . . Open angle

BEST MODE FOR CARRYING OUT THE INVENTION

FIG. 1 shows a perspective view of a roller screw in one embodiment of the invention. The screw roller has a screw shaft 5 with a spiral roller rolling groove 5a formed on the outer peripheral surface thereof, and a nut 6 with a spiral roller rolling groove 6a formed on the inner peripheral surface thereof to be opposed to the roller rolling groove 5a. A plurality of rollers 7 are cross-arranged between the roller rolling groove 5a of the screw shaft 5 and the roller rolling groove 6a of the nut 6 so that axis lines of adjacent rollers 7 are perpendicular to each other. Retainers 8 are provided between the rollers 7 to prevent the rollers 7 from coming into contact with each other.

When the nut 6 is rotated relatively to the screw shaft 5, a plurality of rollers 7 move in a load roller rolling path 9 between the roller rolling groove 5a and roller rolling groove 6a while rolling. Each of the rollers rolling up to one end of the load roller rolling path 9 is scooped by a direction change path 10, and returned to an original position via a roller return path 11 formed inside the nut 6.

Figure 2:
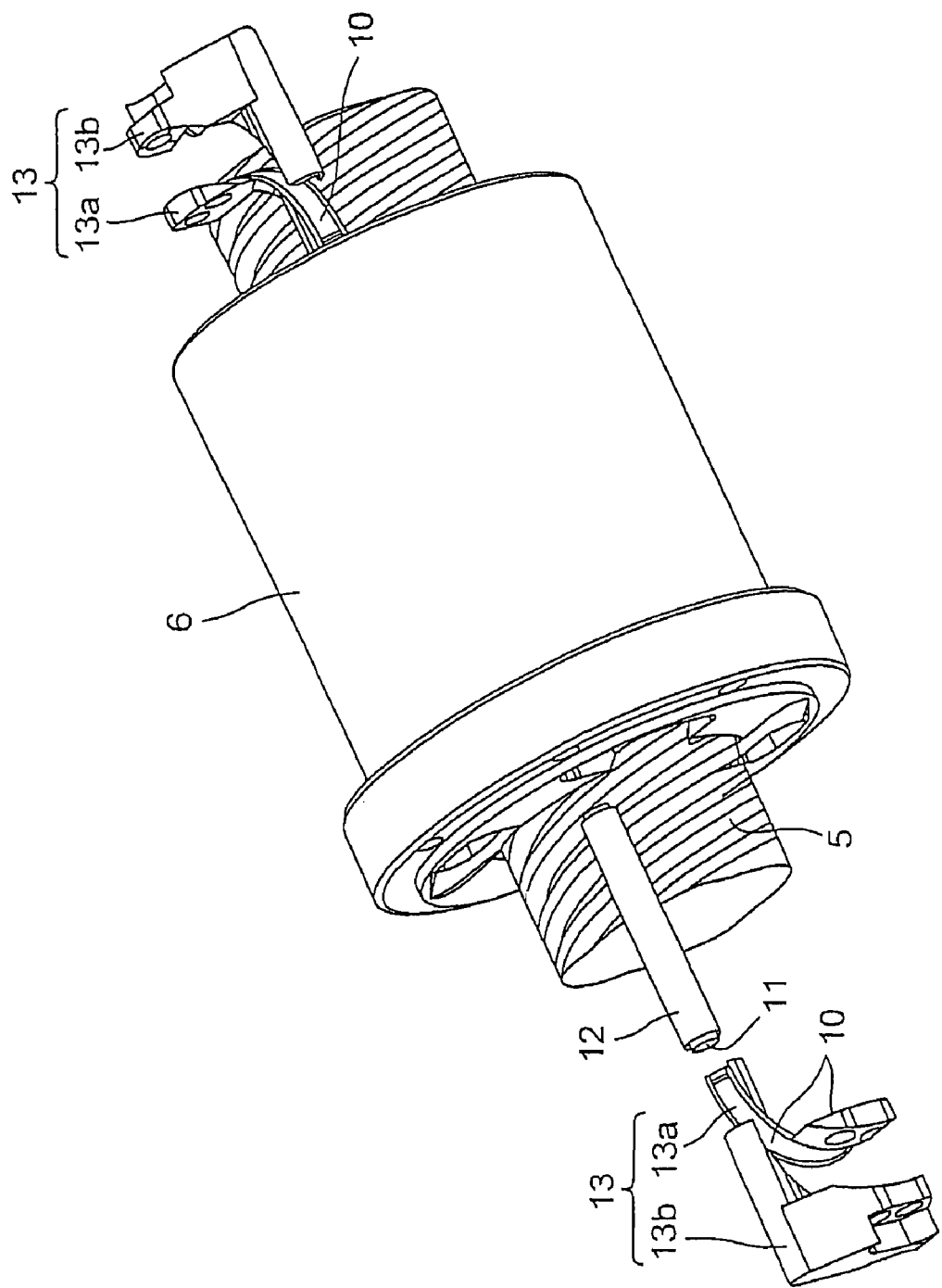
FIG. 2 is an exploded perspective view of principal parts of the roller screw.

FIG. 2 shows an exploded perspective view of principal parts of the aforementioned roller screw. In the nut 6 are inserted roller return path forming members 12. Each of the roller return path forming members 12 is formed in the shape of a pipe, and inside the member 12 is formed the roller return path 11 to move the rollers 7 in the axis line direction of the screw shaft 5.

Direction change path forming members 13 are attached to opposite end faces in the axis line direction of the nut 6. Each of the direction change path forming members 13 is provided with an arc-shaped direction change path 10 to connect the load roller rolling path 9 and roller return path 11. The direction change path forming member 13 scoops the roller 7 rolling in the roller rolling groove 5a of the screw shaft 5, lets the roller 7 pass through the direction change path 10, and guides the roller 7 to the roller return path 11. Each of the direction change path forming members 13 are divided in two parts, the inner periphery side 13a and outer periphery side 13b. Using a fastening member such as a bolt or the like, flanges of the inner peripheral side 13a and the outer peripheral side 13b of each of the direction change path forming members 13 are coupled to the respective end face of the nut 6. The arc-shaped direction change paths 10 are not twisted so as not to rotate the attitude of each of the rollers 7 during which time the roller 7 moves in each of the arc-shaped direction change paths 10.

Figure 3:
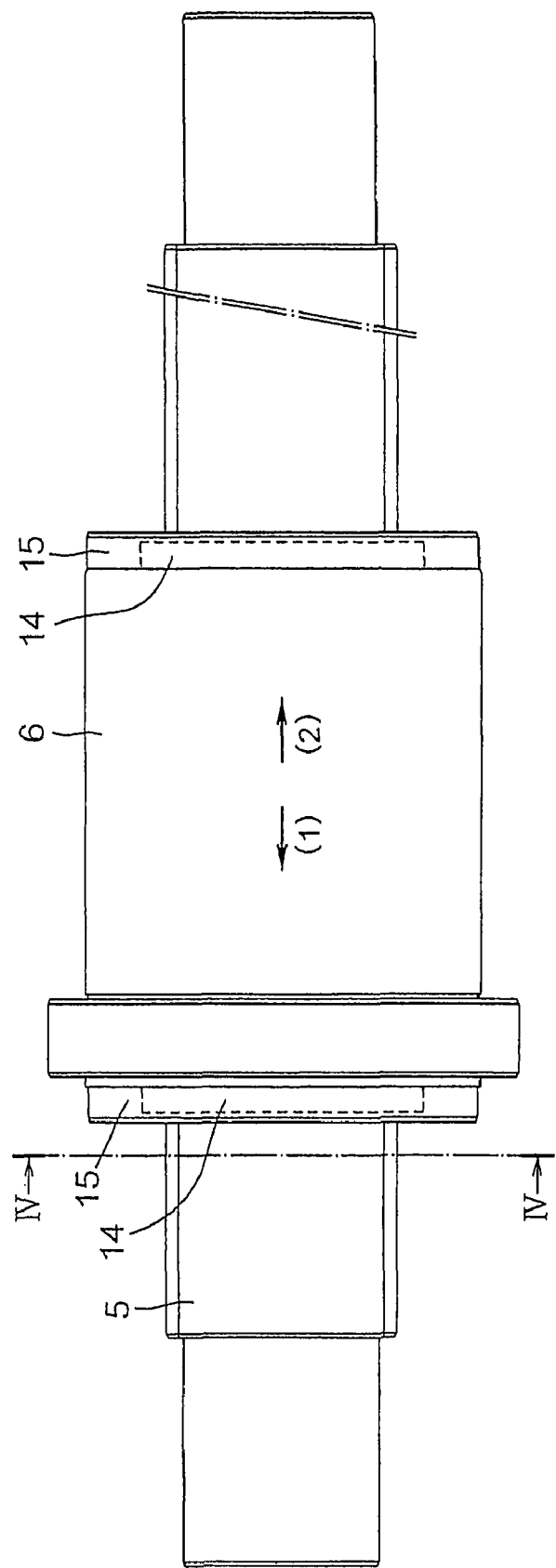
FIG. 3 is a side elevational view of the roller screw with all the parts assembled.
Figure 4:
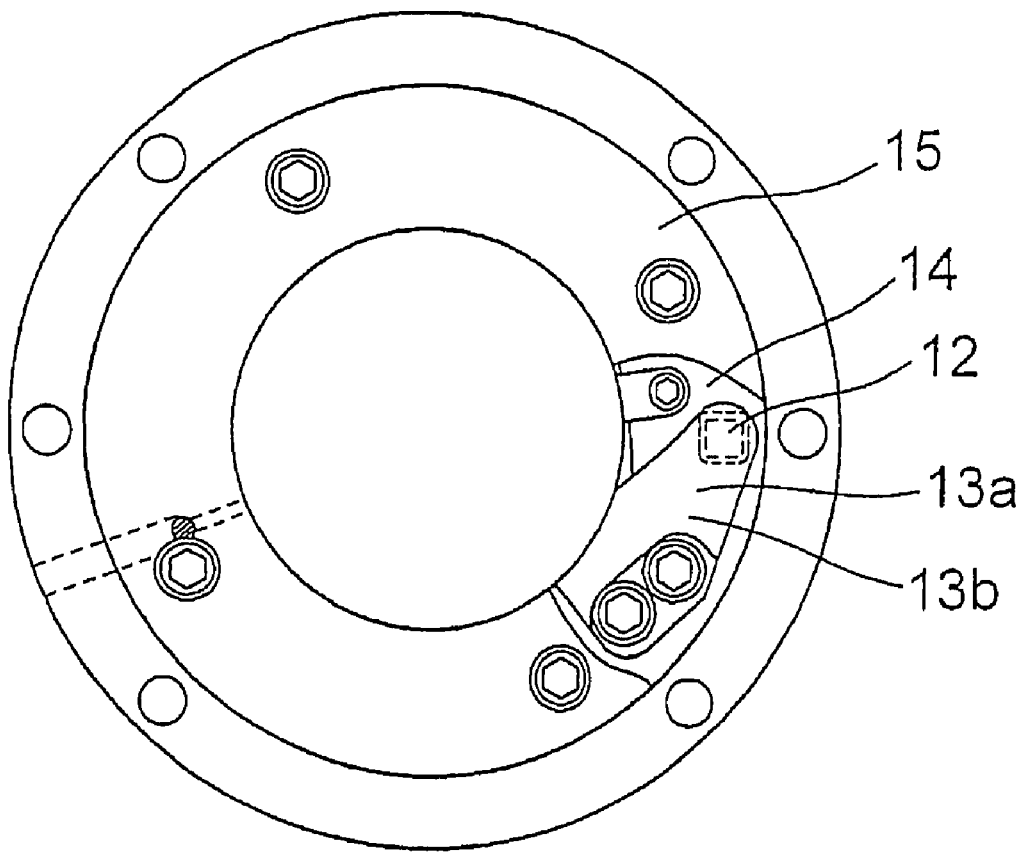
FIG. 4 is a cross-sectional view taken along line IV-IV of FIG. 3 and viewed in the direction of the arrows.

FIG. 3 shows a side elevational view of the roller screw with all the parts assembled, and FIG. 4 shows a view taken along line IV-IV of FIG. 3, looking in the direction of the arrows. Labyrinth seals 14 are attached to opposite end faces in the axis line direction of the nut 6 into which are incorporated the roller return path forming members 12 and the direction change path forming members 13, to remove foreign matter and prevent a lubricant from leaking from inside the nut 6. Caps 15 are placed to cover the entire end faces of the nut 6 with the labyrinth seals 14 attached thereto.

Figure 5:
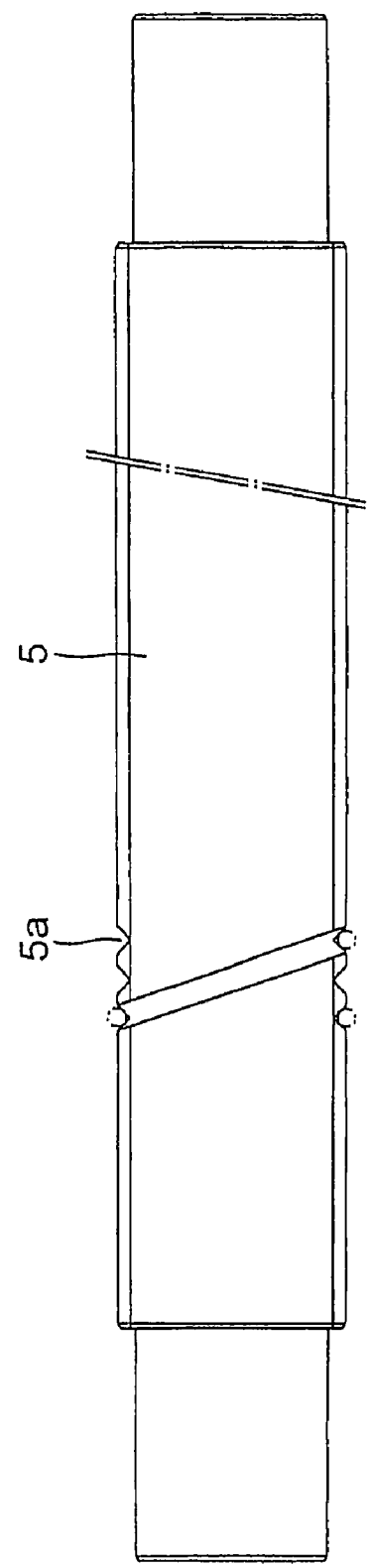
FIG. 5 is a side elevational view showing a screw shaft.

FIG. 5 shows the screw shaft 5. On the outer circumference of the screw shaft 5 is formed the spiral roller rolling groove 5a with a predetermined lead. In this embodiment, the number of threads of the roller rolling groove 5a is set at four to increase the allowable load and decrease the entire length of the nut 6. Naturally, the number of threads of the roller rolling groove 5a can be set at any number such as one, two, three and the like.

Figure 6:
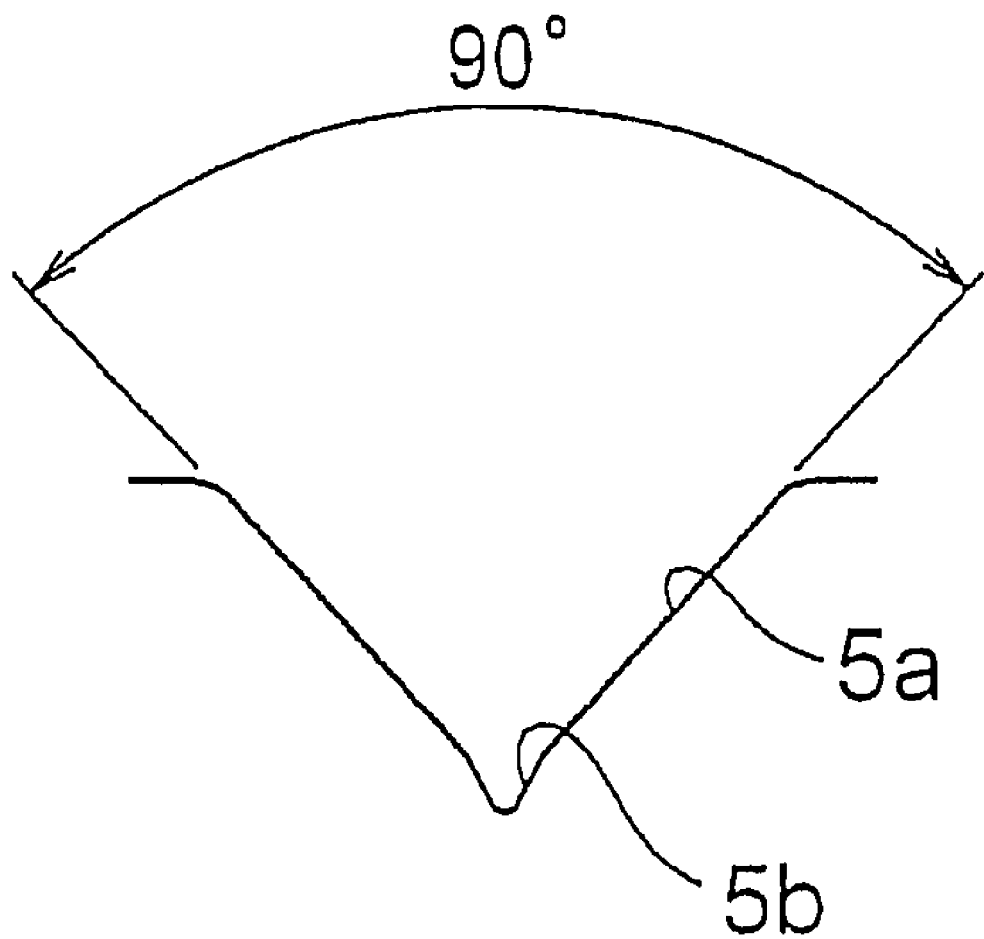
FIG. 6 is a view showing a shape of groove right-angle cross section of a roller rolling groove of the screw shaft.

FIG. 6 shows a shape of groove right-angle cross section of the roller rolling groove 5a of the screw shaft 5. The cross section of the roller rolling groove 5a is in the shape of a V, and the open angle is set at 90 degrees. On the bottom of the roller rolling groove 5a, an arc portion 5b is formed for grinding escape to enable an intersection portion of 90 degrees also to be ground and processed.

Figure 7:
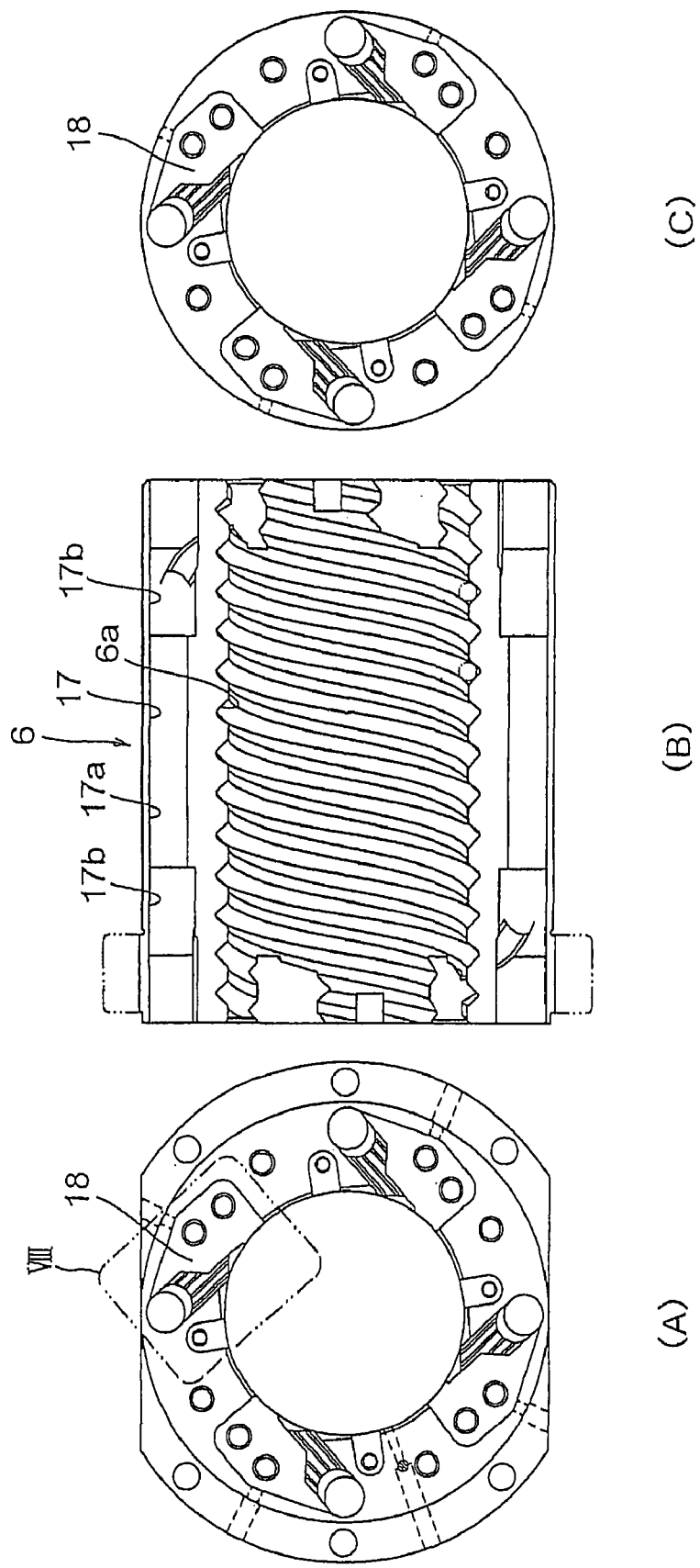
FIG. 7 contains detail views of the nut 6 ((A) shows a front view of the nut, (B) shows a cross-sectional view along the axis line direction, and (C) shows a rear elevational view)

FIG. 7 shows detail views of the nut 6. In FIG. 7, (A) shows a front view of the nut 6, (B) shows a cross-sectional view along the axis line direction, and (C) shows a rear elevational view of the nut 6. On the inner peripheral surface of the nut 6 is formed the spiral roller rolling groove 6a opposed to the roller rolling groove 5a of the screw shaft 5. The nut 6 is further provided with a through hole 17 extending in the axis line direction of the nut 6. In the through hole 17, a center portion 17a is formed to have a small diameter, and each of opposite end portions 17b at opposite ends of the center portion is formed to have a diameter slightly larger than that of the center portion 17a. The roller return path forming members 12 are inserted in the center portion 17a of the through hole 17, and the direction change path forming members 13 are inserted in the opposite end portions 17b. At end faces in the axis line direction of the nut 6 are formed installation bases 18 to attach the direction change path forming members 13 to the nut 6, and the direction change path forming members 13 are installed in the installation bases 18, respectively. The numbers of provided roller return path forming members 12 and direction change path forming members 13 are the same as the number (four in this embodiment) of threads of the roller rolling groove 6a to circulate the rollers 7 respectively rolling in four threads of the roller rolling groove 6a.

Figure 8:
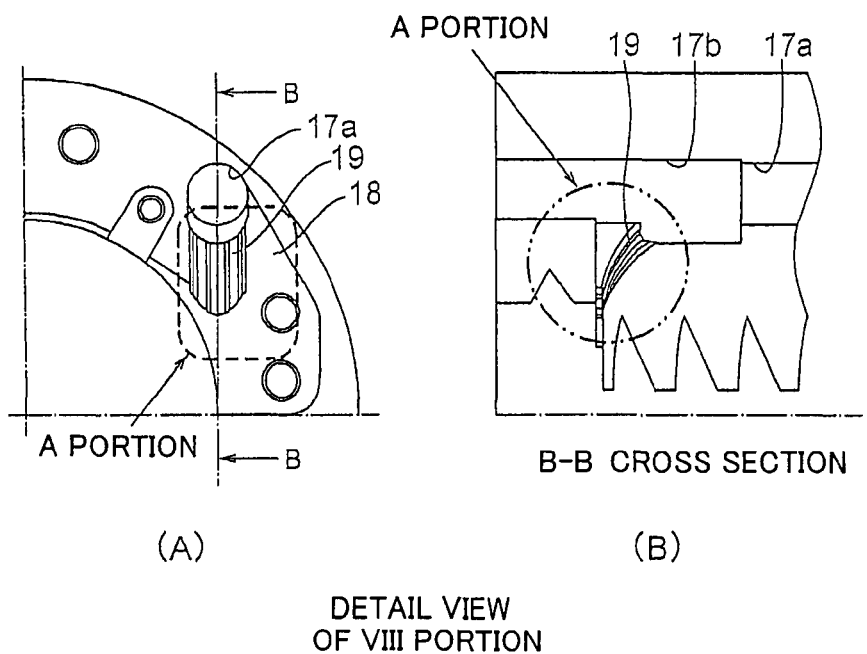
FIG. 8 contains detail views of an installation base of a direction change path forming member ((B) is a cross-sectional view taken along line B-B of (A))

FIG. 8 shows detail views of the installation base 18 of the direction change path forming member 13. The installation base 18 is provided with an arc-shaped escape groove 19 conforming in shape to a thin portion of the direction change path forming member 13, described later. In a typical end-cap ball screw, the end face of the nut is formed to be flat, and an escape groove is not formed. A member forming the direction change path is installed in the flat portion. However, in the case of a roller screw, to circulate the rollers 7 smoothly, the radius of curvature of the direction change path 10 is increased, and the direction change path forming member 13 tends to interfere with the roller rolling groove 6a of the nut 6. By forming the escape groove 19 conforming in shape to the direction change path forming member 13 in the end face of the nut 6, it is possible to prevent the direction change path forming member 13 from interfering with the roller rolling groove 6a.

Figure 9:
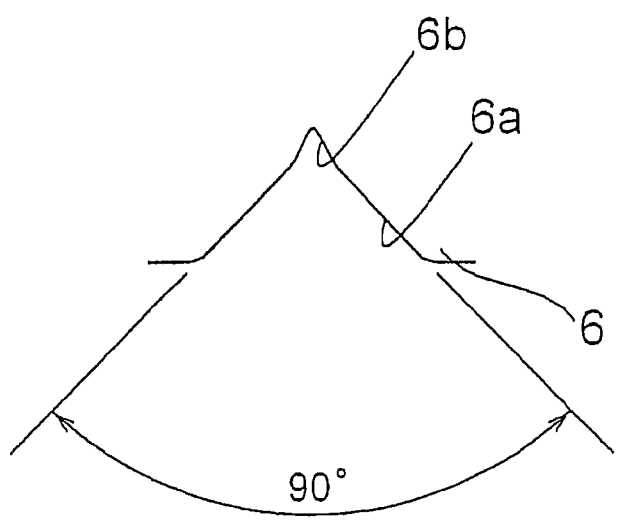
FIG. 9 is a view showing a shape of groove right-angle cross section of a roller rolling groove of the nut.

FIG. 9 shows a shape of groove right-angle cross section of the roller rolling groove 6a of the nut 6. The cross section of the roller rolling groove 6a is in the shape of a V, and the open angle is set at 90 degrees. On the bottom of the roller rolling groove 6a, an arc portion 6b is formed for grinding escape to enable an intersection portion of 90 degrees also to be ground and processed.

The rollers 7 existing between the screw shaft 5 and the nut 6 will be described below. Each of the rollers 7 rolling in the load roller rolling path 9 has a cylindrical shape, and the diameter and height thereof are substantially the same. To be precise, the diameter of the roller 7 is slightly larger than the height of the roller 7. Therefore, the shape of the roller 7 as viewed from the side is close to a square. In the ball screw, each of the balls undergoes loads in one direction of the axis line direction of the screw shaft and the direction opposite to the one direction. In contrast thereto, each of the rollers 7 undergoes a load by the peripheral surface being compressed between a wall surface of the roller rolling groove 5a and another wall surface of the roller rolling groove 6a of the nut 6 opposed to the wall surface, and therefore, is able to undergo only the load in one direction of the axis line direction of the screw shaft 5. By arranging the rollers 7 in a cross manner, the rollers 7 are able to undergo loads in one direction (1) and another direction (2) (see FIG. 3) in the axis line direction of the screw shaft 5.

The diameter D of the roller 7 is larger than the distance between the wall surface of the roller rolling groove 5a of the screw shaft 5 and another wall surface of the roller rolling groove 6a of the nut 6 opposed to the wall surface, i.e. of the so-called over-size. Therefore, the roller undergoes elastic deformation inside the load roller rolling path 9, and a load corresponding to the deformation exists inside the nut 6 as a pre-pressing load. Since the rollers 7 are disposed in a cross arrangement in the load roller rolling path 9, the loads applied to the nut 6 from the rollers 7 act in the direction in which adjacent rollers 7 repel each other.

Figure 10:
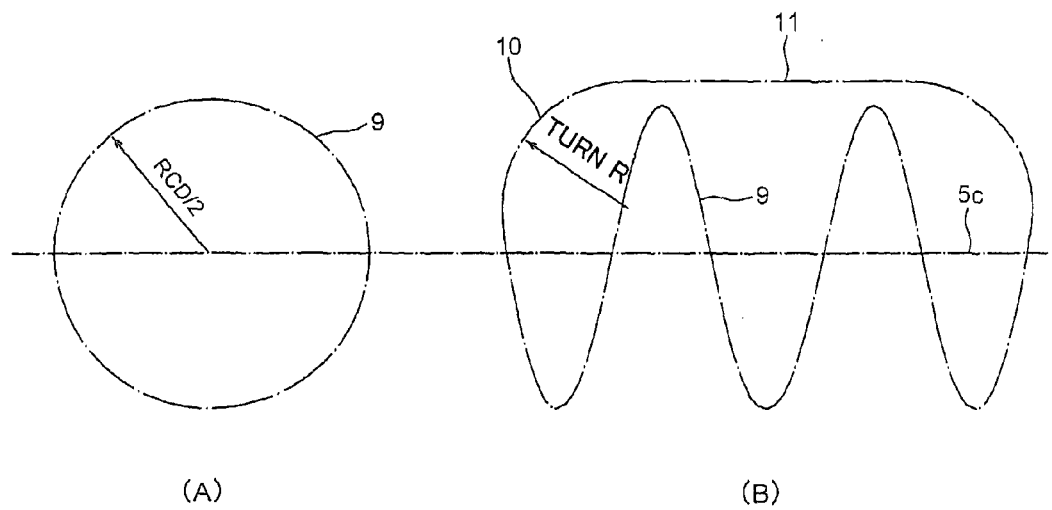
FIG. 10 contains views showing a raceway of the roller circulating in an infinite circulation path ((A) shows a state as view from the axis line direction of the screw shaft, and (B) shows a state as viewed from the side of the screw shaft)

FIG. 10 shows a raceway of the roller circulating in the spiral load roller rolling path 9, arc-shaped direction change path 10 and linear roller return path 11. FIG. 10(A) shows a raceway of the roller moving in the load roller rolling path 9 (a state as viewed from the axis line direction of the screw shaft), and FIG. 10(B) shows a raceway of the roller circulating in the entire infinite circulation path (a state as viewed from the side of the screw shaft). The raceway of the roller in the load roller rolling path 9 is a spiral shape with the radius of RCD/2. The raceway of the roller in the roller return path 11 is a straight line parallel to the axis line 5c of the screw shaft 5. The raceway of the roller in the direction change path 10 is an arc with the radius R of curvature. In bonding portions of the load roller rolling path 9, direction change path 10 and roller return path 11, the tangential direction of the raceway of the roller is continuous. By this means, the raceway in the bonding portions is made smooth.

Figure 11:
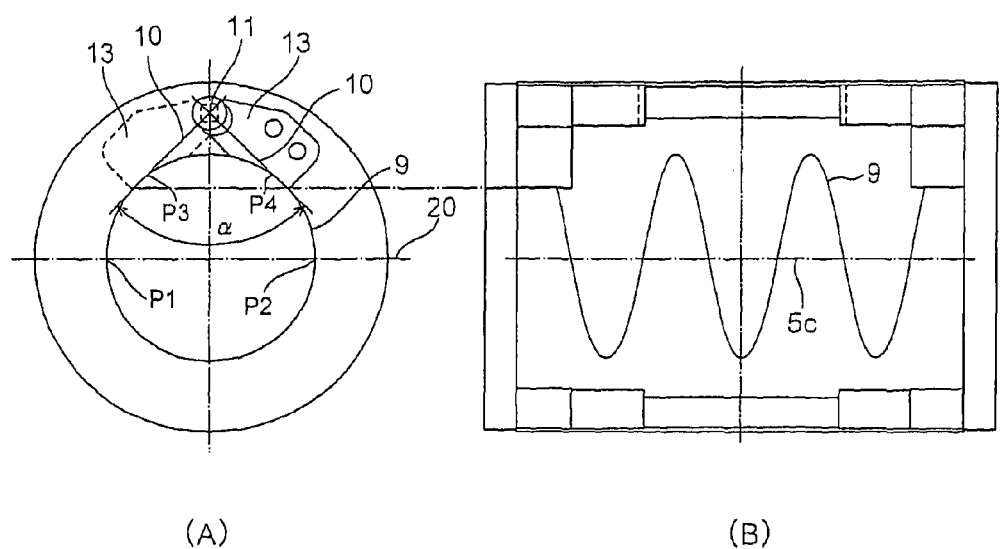
FIG. 11 contains views showing the positional relationship between a pair of direction change path forming members ((A) shows a state as viewed from the axis line direction of the nut, and (B) is a cross-sectional view along the axis line of the nut)

FIG. 11 shows the positional relationship between the direction change path forming member 13 attached to one end face of the nut 6 and the direction change path forming member 13 attached to the other end face of the nut 6. As described above, the center line of the roller return path 11 extends in parallel with the axis line 5c of the screw shaft 5. As shown in FIG. 11(A), the center line of the direction change path 10 extends in the tangential direction of the center line of the load roller rolling path 9 in a state as viewed from the axis line direction of the screw shaft 5. The center line of the direction change path 10 on the front side and the center line of the direction change path 10 on the back side cross each other at a predetermined open angle α. The roller return path 11 rotates the attitude of the roller 7 moving in the path 11 the same angle α as the open angle, described specifically later. The open angle tends to increase, as the radius of curvature of the direction change path 10 increases. In this embodiment, the radius of curvature of the direction change path 10 is set at about five times the diameter D of the roller 7, for example, and the open angle is set at 90 degrees to 100 degrees, for example.

In the return pipe type roller screw, since the roller is scooped from a point P1 of intersection of the load roller rolling path 9 and a horizontal line 20 to return to a point P2 of intersection on the opposite side in FIG. 11(A), the number of turns of the rollers is 2.5, 3.5, 4.5 or the like, and the fraction is thus 0.5. In contrast thereto, in the roller screw of this embodiment, the open angle α of the direction change path is 90 to 100 degrees, the roller is scooped from a point P3 to return to a point P4, the number of turns of the rollers is 2.7, 3.7, 4.7 or the like, and the fraction is 0.7. As compared with the return pipe type roller screw, rollers are held more evenly in the circumference direction of the load roller rolling path 9, and the load balance of the roller screw is improved.

Figure 12:
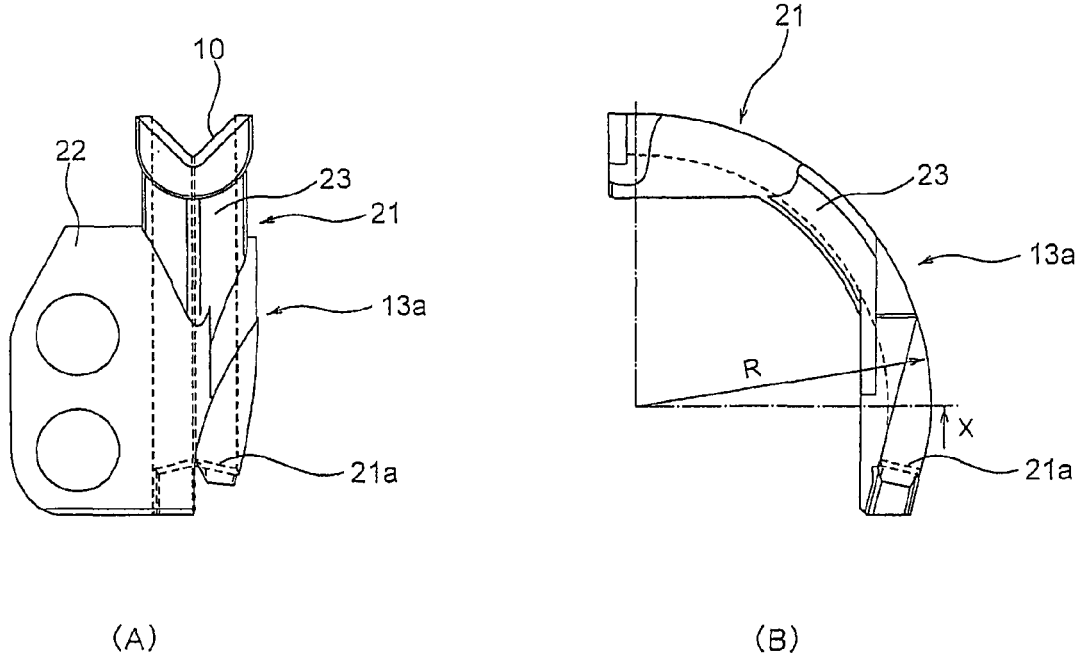
FIG. 12 contains views showing the inner periphery side of the direction change path forming member ((A) shows a front view, and (B) shows a side elevational view)
Figure 13:
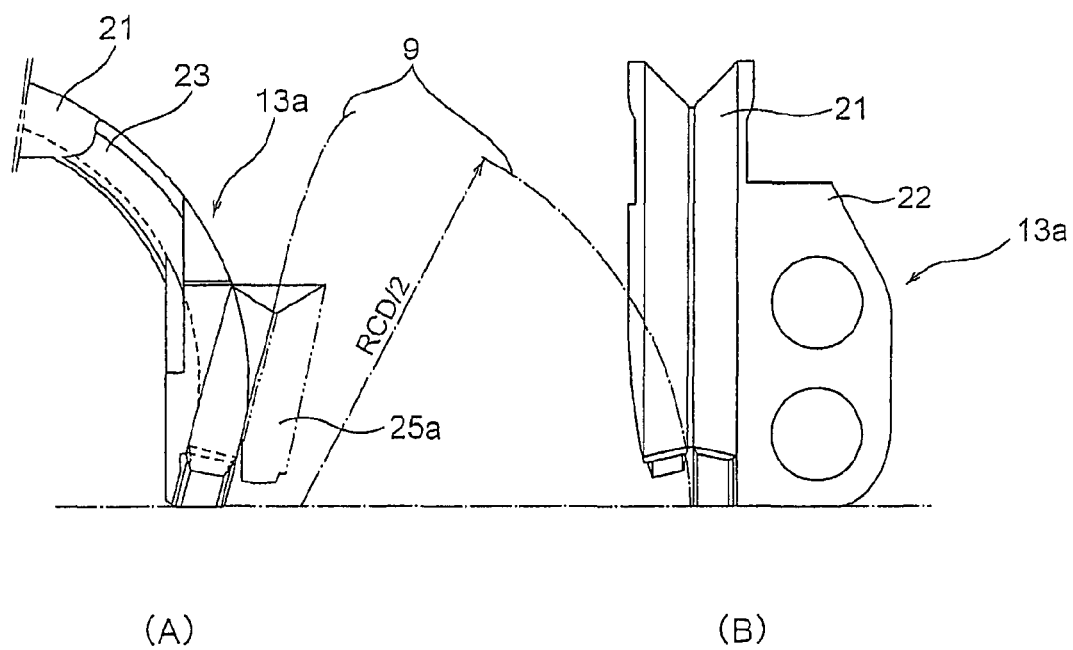
FIG. 13 contains another views showing the inner periphery side of the direction change path forming member (A) shows a side elevational view, and (B) shows a rear elevational view)

FIGS. 12 and 13 show the inner periphery side 13a of the direction change path forming member. The inner periphery side 13a of the direction change path forming member has a main body portion 21 in which the direction change path with the radius R of curvature is formed, and a flange portion 22 attached to the end face of the nut 6. At one end of the main body portion 21 is formed a scooping portion 21a that enters the load roller rolling path 9 to scoop the roller 7. The other end of the main body portion 21 is fitted into the roller return path forming member 12. The scooping portion 21a of the inner periphery side 13a and a scooping portion of the outer periphery side 13b cooperate to scoop the roller 7 rolling in the spiral load roller rolling path 9 in the tangential direction. Immediately after the roller is scooped, the direction change path 10 changes the direction of the roller 7, and moves the roller along the arc-shaped direction change path 10.

On the inner periphery side 13a of the direction change path forming member is formed the thin portion 23 bent in the shape of a curve conforming to the shape of the direction change path 10 while protruding to the nut side over the end face of the nut 6 to which the direction change path forming member 13 is attached. The cross section of the thin portion 23 is formed in the shape of a V. The thin portion 23 is fitted into the escape groove 19 (see FIG. 8) formed at the end face of the nut 6.

Figure 14:
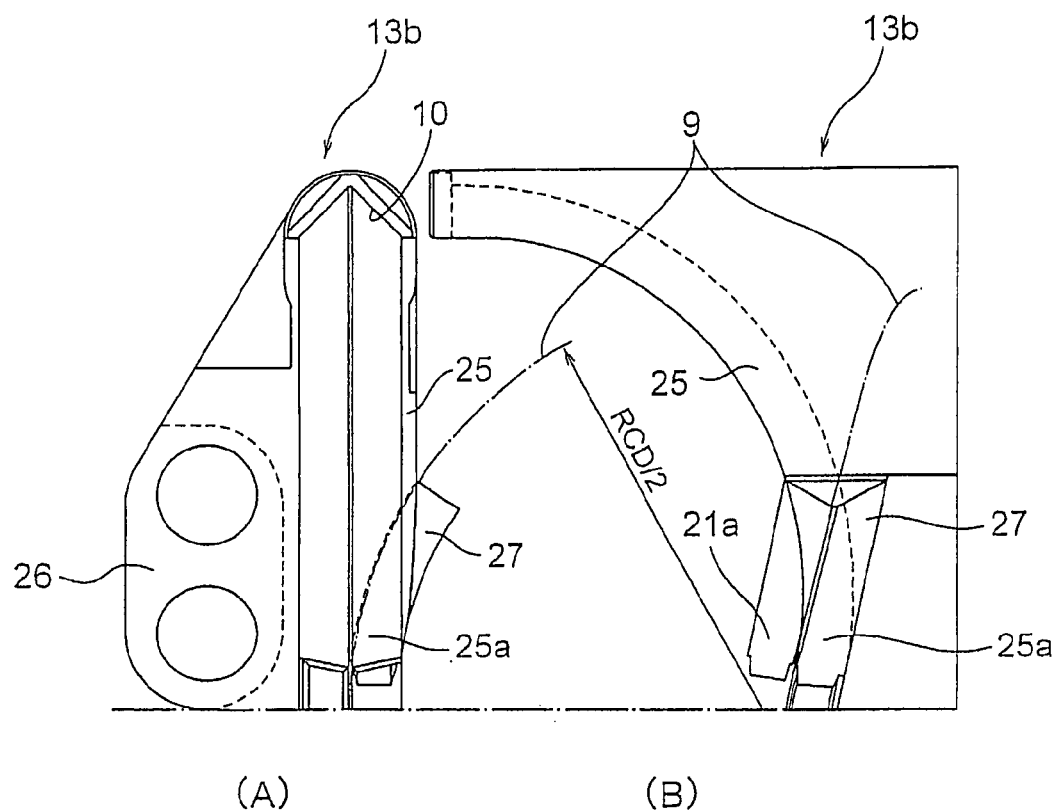
FIG. 14 contains views showing the outer periphery side of the direction change path forming member ((A) shows a front view, and (B) shows a side elevational view)
Figure 15:
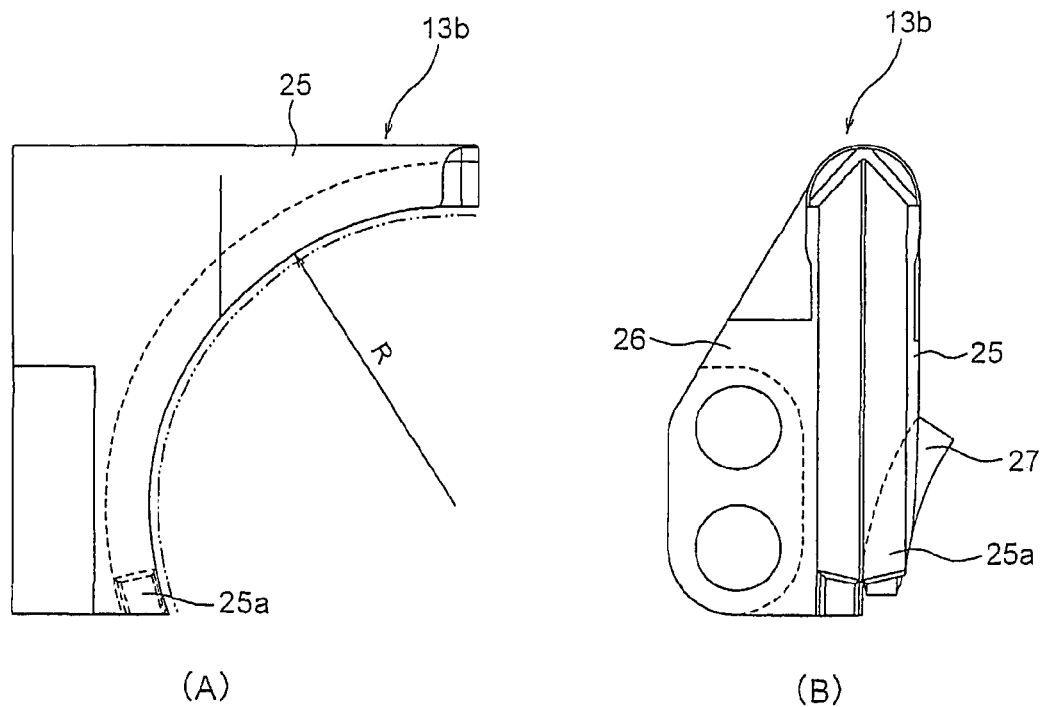
FIG. 15 contains another views showing the outer periphery side of the direction change path forming member ((A) shows a side elevational view, and (B) shows a front view)

FIGS. 14 and 15 show the outer periphery side 13b of the direction change path forming member. The outer periphery side 13b of the direction change path forming member has a main body portion 25 in which the direction change path 10 with the radius R of curvature is formed, and a flange portion 26 attached to the end face of the nut 6. At one end of the main body portion 25 is formed a scooping portion 25a that enters the load roller rolling path 9 to scoop the roller. The other end of the main body portion 25 is fitted into the roller return path forming member 12. The scooping portion 25a of the outer periphery side and the scooping portion 21a of the inner periphery side cooperate to scoop the roller 7 rolling in the spiral load roller rolling path 9 in the tangential direction. Immediately after the roller is scooped, the direction change path 10 changes the direction of the roller 7, and moves the roller along the arc-shaped direction change path 10. At the outer periphery portion 13b of the direction change path forming member is formed a protruding portion 27 conforming to the shape of the roller rolling groove 5a of the screw shaft 5, and the strength of the scooping portion 25a is thus secured. The direction change path forming member 13 may be made of metal or resin.

Figure 16:
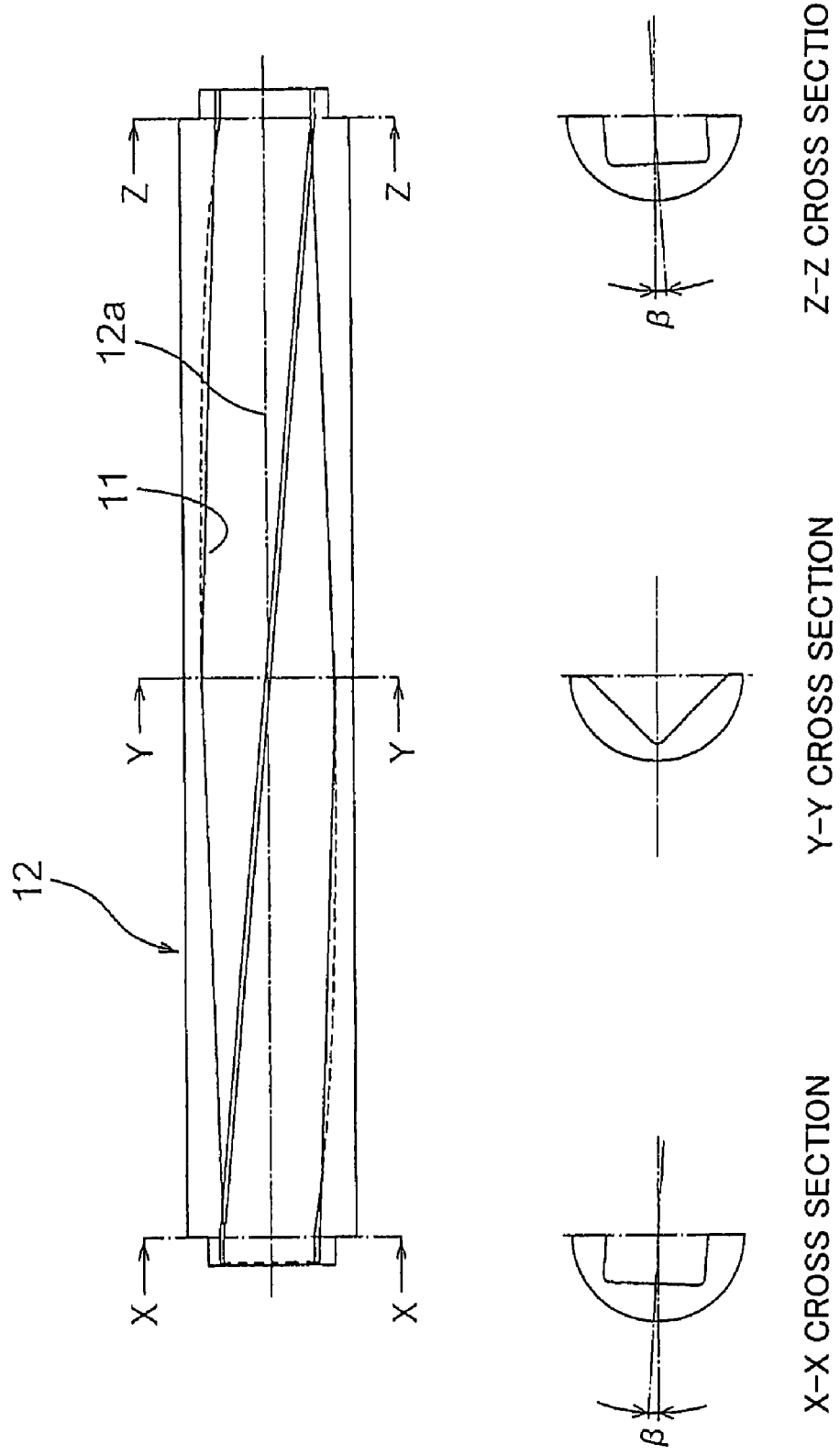
FIG. 16 is a cross-sectional view of a roller return path forming member.

FIG. 16 shows a cross-sectional view of the roller return path forming member 12. The roller return path 11 is twisted to rotate the attitude of the roller for a period during which the roller is passed through the roller return path 11. The roller rotates about a center line 12a of the roller return path 11, while moving along the center line 12a. Herein, the moving distance of the roller 7 is proportional to the rotation angle of the roller 7. In this example, the roller 7 rotates 90 degrees plus 2β degrees (open angle α of a pair of direction change paths as viewed from the axis line direction of the screw shaft) for a period during which the roller 7 moves to the other end from one end of the roller return path 11. The roller return path forming member 12 is divided into two parts along the center line. The roller return path forming member 12 may be made of metal or resin.

Figure 17:
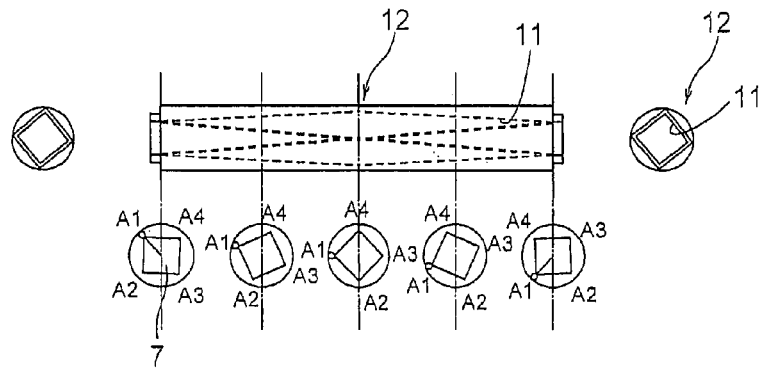
FIG. 17 is a view showing rotation of the attitude of the roller moving in the roller return path.

FIG. 17 shows rotation of the attitude of the roller 7 moving in the roller return path 11. From FIG. 17, it is understood that a position A1 of the roller 7 moves from obliquely upper left to obliquely lower left, and the attitude of the roller rotates about 90 degrees, while the roller moves in the roller return path 11.

By rotating the attitude of the roller 7 in the roller return path 11, when the roller 7 is scooped from the load roller rolling path 9 and returned to the load roller rolling path 9 again, it is possible to conform the attitude of the roller 7 with the rectangular side face to the shape of the load roller rolling path of rectangular cross section. Further, there is the fear of clogging with the roller when the attitude of the roller 7 is rotated in the arc-shaped direction change path 10, but the roller is rotated in the linear roller return path 11, and therefore, the fear of clogging with the roller is eliminated.

Further, by rotating the attitude of the roller 7 the same angle as the open angle α of a pair of direction change paths 10, the roller on which the load is imposed from one direction (1) of the axis line of the screw shaft 5 returns to the load roller rolling path 9 without being inverted (while allowing the load to be imposed on the roller again from one direction (1) of the axis line of the screw shaft 5). Furthermore, the retainers 8 between the rollers can also be returned without being inverted. Some retainers 8 are formed in the shape of a sector as viewed from the axis line direction of the screw shaft 5 to move an axis line of the roller rolling in the annular-ring-shaped load roller rolling path toward the center line of the screw shaft (whereby it is possible to prevent a phenomenon in which the roller is inclined from the predetermined axis line i.e. so-called skew of the roller.) When the sector-shaped retainer is inverted, the width on the inner periphery side of the retainer becomes wide, while the width on the outer periphery side should be wide. By rotating the attitude of the roller 7 the same angle as the open angle α of a pair of direction change paths 10, it is possible to prevent the rollers and retainers from being inverted.

Figure 18:
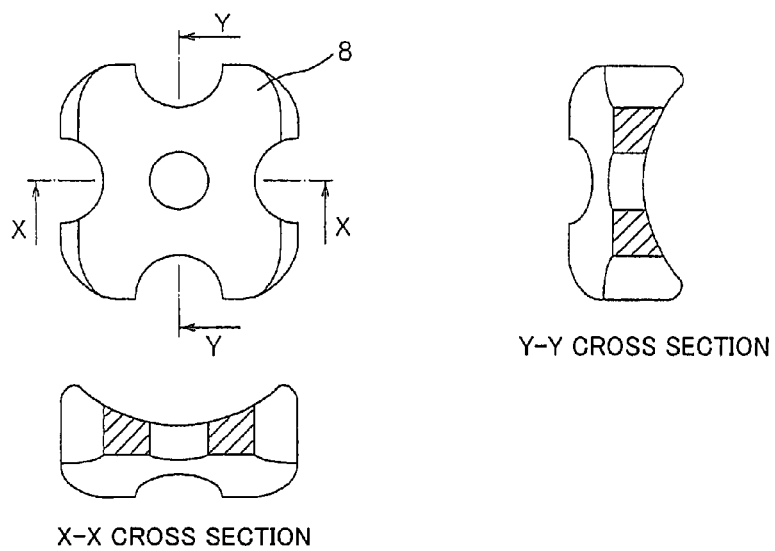
FIG. 18 is a detail view of a retainer.
Figure 19:
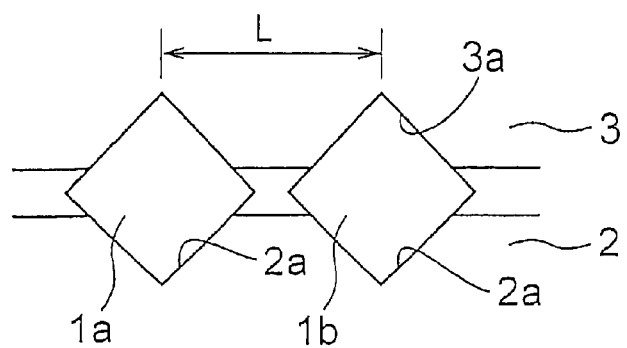
FIG. 19 is a view showing the rollers held in a load rolling path.

FIG. 18 shows detail views of the retainer 8 for use in this embodiment. The retainer 8 holds the attitude of the roller so that axis lines of adjacent rollers are maintained at a right angle. The retainer is different from the above-mentioned sector-shaped retainer, and is flat such that the thickness is not changed on the inner periphery side and outer periphery side of the annular-ring-shaped load roller rolling path 9.

Superior respects of the roller screw of this embodiment to the return pipe type roller screw will be summarized and explained below.

First, even when the lead is increased, it is possible to design the roller return path 11 and the direction change path 10 without interfering with the roller rolling groove 6a of the nut 6, resulting in the structure suitable for a large lead.

In the return pipe type, a return pipe is attached to the side face of the nut, and the nut is thereby increased in size. In the roller screw of this embodiment, the roller return path 11 is formed inside the nut 6, and it is thereby possible to make the nut 6 compact. Further, by increasing the number of threads of the screw, the entire length of the nut 6 can be decreased.

The circulation parts are divided into the direction change path forming member 13 and the roller return path forming member 12, the roller return path 11 formed in the linear roller return path forming member 12 is twisted, and whereby it is possible to manufacture the circulation parts with ease, and molding is made ease also.

It is hard to insert rollers in a circulation path in the return pipe type. In contrast thereto, in the roller screw of this embodiment, while the roller screw is allowed to stand, rollers are inserted sequentially with the outer periphery side 13b of the direction change path forming member removed, and assembly is thus made ease.

The present application is based on Japanese Patent Application No. 2004-260502 filed on Sep. 8, 2004, entire content of which is expressly incorporated by reference herein.

The invention claimed is:

1. A roller screw comprising:
a screw shaft with a spiral roller rolling groove formed on an outer peripheral surface thereof;
a nut with a spiral roller rolling groove formed on an inner peripheral surface thereof to be opposed to the spiral roller rolling groove of the screw shaft; and
a plurality of rollers arranged in a load roller rolling path between the spiral roller rolling groove of the screw shaft and the spiral roller rolling groove of the nut,
wherein a linear roller return path is provided inside the nut, the linear roller return path extending linearly in parallel with an axis line of the nut,
direction change path forming members are respectively attached to opposite end faces of the nut in an axis line direction of the nut, each of the direction change path forming members includes an arc-shaped direction change path that connects the load roller rolling path and the linear roller return path,
the linear roller return path is twisted to rotate an attitude of each of the rollers for a period during which each of the rollers moves in the linear roller return path,
center lines of the direction change paths cross each other at a predetermined open angle as viewed from the axis line direction of the screw shaft,
the linear roller return path rotates the attitude of each of the rollers the predetermined open angle,
in each of the direction change path forming members is formed a portion bent in the shape of a curve conforming to the shape of an inner periphery of each of the direction change paths while protruding to the inside of the nut from respective opposite end faces of the nut to which the direction change path forming members are attached, and
escape grooves conforming in shape to the portion bent in the shape of a curve are respectively formed in the opposite end faces of the nut to which the direction change path forming members are attached.

2. The roller screw according to claim 1, wherein in the nut is formed a through hole extending in the axis line direction of the nut, and
in the through hole is inserted a roller return path forming member in which the roller return path is formed.

3. The screw roller according to claim 1, wherein the roller rolling groove of the screw shaft is formed to have a V-shaped cross section,
the roller rolling groove of the nut is formed also to have a V-shaped cross section, and
the plurality of rollers is cross-arranged in the load roller rolling path so that axis lines of adjacent rollers are perpendicular to each other as viewed from a direction in which the rollers proceed.

4. The roller screw according to claim 1, wherein the predetermined angle is between 90 and 100 degrees.

* * * * *